Sept. 20, 1949.  H. H. BASHORE  2,482,147
TESTING APPARATUS FOR ELASTOMERIC MATERIAL
Filed May 6, 1946  2 Sheets-Sheet 2
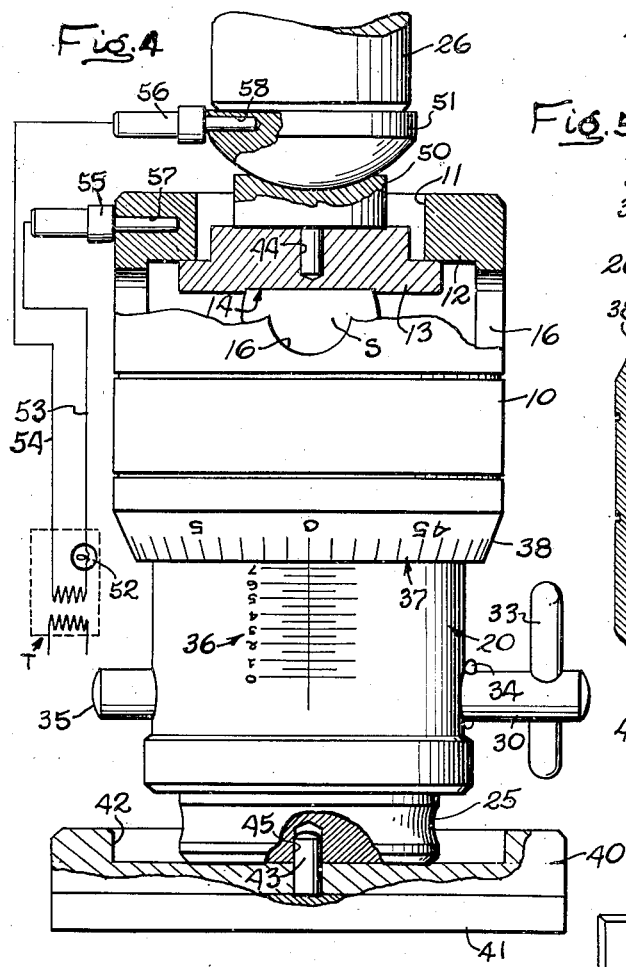
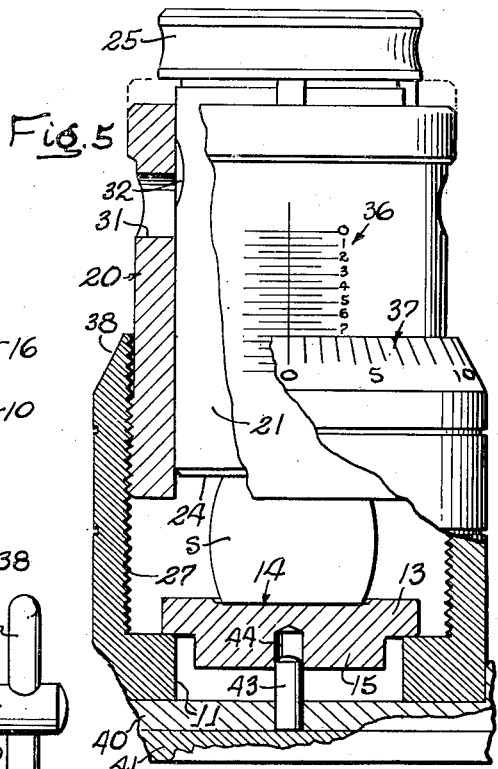
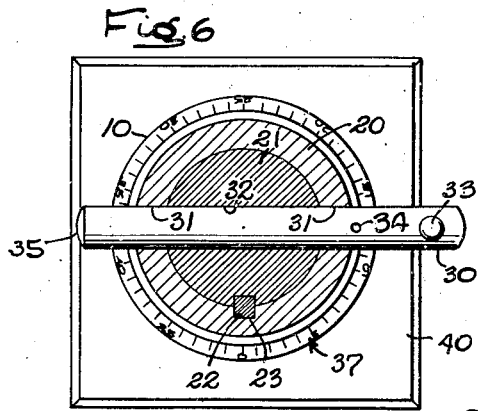
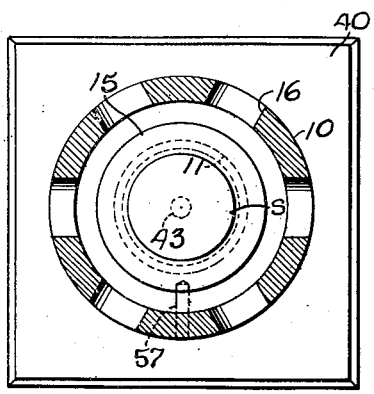
INVENTOR
Homer H. Bashore
ATTORNEYS Patented Sept. 20, 1949

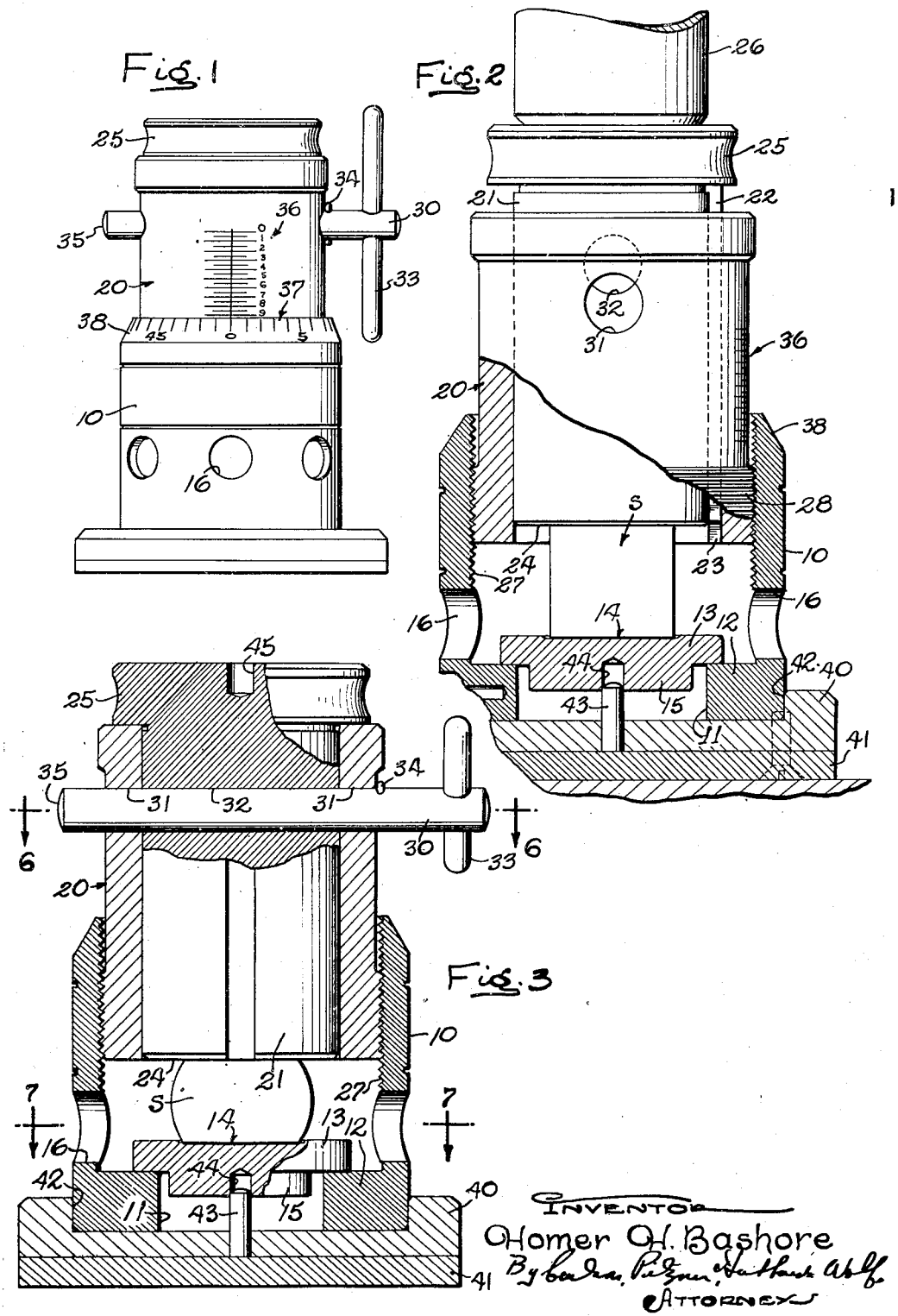

2,482,147

UNITED STATES PATENT OFFICE 2,482,147

TESTING APPARATUS FOR ELASTOMERIC MATERIAL

Homer H. Bashore, Chicago, Ill., assignor to Precision Scientific Co., Chicago, Ill., a corporation of Illinois Application May 6, 1946, Serial No. 667,561

4 Claims. (Cl. 73—94)

1

The invention relates to apparatus for testing elastomeric materials and more particularly to apparatus for measuring the compression fatigue and other physical properties of such materials.

Elastomeric materials such as rubber and other rubber-like substances when subjected to a constant deformation exhibit a relaxation or decrease in stress which property is commonly referred to as compression fatigue. Evaluation of this property is essential to the determination of the adaptability of the material for use under conditions in which it is subjected to more or less continuous compressive stresses such as in motor or machinery mountings, gaskets, packings, etc. With this in view the American Society for Testing Materials has established a tentative method of testing in which a specimen of the material is deflected either under constant load or constant deformation for a predetermined period and under specified conditions of temperature and humidity. The height of the specimen after its release from deformation is compared with its original height and the difference is called the compression set of the material. Thus the comparative quality of various materials may be readily determined.

Another test of the same general character involves the measurement of the change in the force exerted by the specimen under constant deformation. A method of performing this test is described in detail in a paper entitled "Relaxation of Rubber-like Materials" presented by Irving L. Hopkins, at the Fourth Annual Meeting of the American Society for Testing Materials, held at Pittsburgh, Pennsylvania, June 28 to July 2, 1943.

The primary object of the present invention is to provide apparatus in the nature of a test cell with which either of the above tests may be performed expeditiously and with a high degree of precision and by which the load required to produce a given deflection of the specimen or the deflection produced by a definite load may be quickly and accurately determined.

Another object is to provide a test cell of the above general character embodying means for directly measuring the initial height as well as the deflection of the specimen.

A further object is to provide improved means for giving a positive indication when the specimen is at equilibrium, that is, when the force exerted by the specimen under compression is balanced by the application of a counterforce.

It is also an object of the invention to provide a reusable precision test cell for elastomeric materials which is rugged in construction and which may be subjected to widely varied temperature and humidity conditions without deterioration.

Other objects and advantages of the invention will become apparent from the following detailed description of the preferred embodiment illustrated in the accompanying drawings in which:

Figure 1 is a side elevational view of a test cell embodying the features of the invention.

Fig. 2 is a partly sectioned side view of the test cell with a specimen in place and showing the position of the parts at the beginning of a test.

Fig. 3 is a vertical sectional view of the test cell showing the position of the parts with the specimen under deflection.

Fig. 4 is a side view of the test cell with parts broken away to show the equilibrium indicating means.

Fig. 5 is a partly sectioned side view of the test cell showing the position of the parts for measuring the recovery of a specimen after deformation.

Fig. 6 is a transverse sectional view taken in a horizontal plane substantially on the line 6—6 of Fig. 3.

Fig. 7 is a transverse sectional view taken in a horizontal plane substantially on the line 7—7 of Fig. 3.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the invention has been shown as embodied in a test cell particularly adapted for handling specimens of the size adopted as standard by the American Society for Testing Materials. Such specimens are in the form of cylinders 1.129 inches in diameter, thus having a cross sectional area of 1 square inch. The specimens are ordinarily 1 inch or less in height.

Referring to the drawings, the improved test cell comprises a rigid metal shell or base 10, preferably in the form of a hollow cylindrical barrel having an opening 11 at its lower end encircled by an inturned flange 12 integral with the body of the barrel. The flange 12 forms an annular platform for a floating platen 13 having a flat, slightly recessed upper face surface 14 for supporting a specimen S undergoing test. The platen 13, as shown, is in the form of a disk having on its underside an extension 15 of reduced diameter adapted to fit loosely in the opening 11 to permit limited lateral movements of the platen for centering it in the base 10. Openings 16 in the side walls of the base permit free circulation of air or other fluid medium around the specimen during the aging step of the tests as will appear presently.

Mounted on the base 10 for adjustment toward and from the platen 13 is a member 20 herein shown as a tubular sleeve which serves as a guide and locating means for a plunger 21 by which a compressive force may be applied to the specimen supported on the platen 13. The plunger 21 is preferably cylindrical in form and is closely fitted in the sleeve member 20 for axial movement therein but held against rotational movement by a key 22 (Figs. 2 and 6) engaging in a longitudinal slot 23 in the inner wall of the sleeve member. At its lower end, the plunger is formed with a flat surface 24 for engagement with the specimen under test, such end surface being parallel to the supporting surface 14 of the platen. An enlarged head 25 is provided on the upper end of the plunger for engagement by the operating member 26 of a conventional compression loading machine.

In the exemplary test cell, the base 10 is threaded internally as at 27 for cooperation with external threads 28 formed on the lower end of the sleeve member 20. The sleeve member may therefore be advanced or retracted with reference to the platen by relative rotation of the base and sleeve while at the same time the sleeve is restrained against movement by pressures applied axially thereof by a compressed specimen.

Provision is made for locking the plunger 21 and the adjustable sleeve member 20 together whereby the latter is enabled to retain the plunger indefinitely in any specimen compressing position to which it has been moved by the compression loading machine. The locking means, as herein shown, comprises an elongated cylindrical pin 30 adapted for insertion through and having a close fit with holes 31 in opposite sides of the sleeve member 20 and a hole 32 extending diametrically through the plunger 21. A handle 33 is provided at one end of the locking pin for convenience in inserting or withdrawing it and a suitable stop element such as a cross pin 34 projecting radially from the locking pin serves to determine its limit position in the sleeve member. Preferably the free end of the locking pin is rounded as at 35 to facilitate its entry into the hole 32 in the plunger.

In accordance with the invention, provision is made for directly measuring the spacing of the plunger surface 24 from the specimen supporting surface 14 of the platen so that the height of the specimen can be measured or the plunger surface can be located for a predetermined compression of the specimen without resort to the use of a micrometer or other measuring device. For this purpose the plunger is provided with a graduated scale 36 adapted to cooperate with a vernier scale 37 inscribed on the upper end of the base 10 which is preferably beveled as indicated at 38 to locate the scales in close proximity.

The scales 36 and 37 are accurately calibrated with respect to the spacing of the plunger surface 24 from the platen surface 15 when the plunger is located in a predetermined fixed position in the sleeve member, in this instance when the plunger is locked to the sleeve member by the pin 30. It will be understood, of course, that the scales 36 and 37 may be graduated in accordance with any preferred standard of measure, those shown being graduated to measure in thousandths of an inch. Accordingly, the height of the specimen may be determined with a high degree of precision by locking the plunger and sleeve member together and screwing the latter into the base until the surface 24 of the plunger touches the specimen. Likewise the location of the plunger for compressing the specimen a predetermined amount may be accurately determined by disengaging the plunger from the sleeve member and screwing the latter into the base the required amount as indicated by the scales 36 and 37. Thereafter the plunger is forced inwardly by application of a load thereto until the holes 31 and 32 aline and permit the entry of the locking pin 30 which automatically coordinates the plunger contact surface with the measuring scales.

To facilitate the assembly of the test cell for the reception of a specimen, I provide a platform structure adapted to support the base 10 and to accurately center the platen 13 therein. The platform structure, as shown in Figs. 3, 6 and 7, comprises a rectangular metal plate 40 mounted on a base 41 of softer material such as hard rubber and having a recess 42 in its upper face dimensioned to receive the base 10 of the cell with a close fit. Projecting upwardly from the exact center of the recess 42 is a locating pin 43 adapted to engage in a central locating hole 44 opening in the bottom of the platen. Thus the platen may be accurately centered with respect to the base and maintained in such centered position until clamped in place by the compression of a specimen against its supporting surface 14.

The platform structure may also be used for holding the test cell in an inverted position when it is desired to measure the force exerted by the specimen after being under constant deformation for an interval. For this purpose the outer end or head 25 of the plunger 21 is formed with a flat surface adapted to rest on the plate 40 and the head is provided with a central locating hole 45 adapted to receive the locating pin 43 as shown in Fig. 4 of the drawings.

Measurement of the force exerted by the compressed specimen is performed on the compression loading machine heretofore referred to or by other apparatus capable of exerting a measured pressure on the platen 13 sufficient to counterbalance the force exerted thereon by the specimen. The test cell and supporting platform are placed in the compression machine in the inverted position shown in Fig. 4 with the platen centered below the load applying member 26 of the machine. To guard against any tilting of the platen a pressure equalizer may be interposed between member 26 and the platen. As herein shown, the equalizer comprises a pair of superimposed members 50 and 51 having flat surfaces for engagement with the member 26 and platen 13 and cooperating concave and convex surfaces providing a ball joint between the members. Thus the members may rock relative to each other while transmitting the force of the member 26 uniformly to the platen 13.

With the apparatus set up as above described a progressively increasing load is applied to the platen 13 by the member 26 until the force exerted by the compressed specimen S is exactly counterbalanced. This point is indicated by disengagement of the platen 13 from its seat against the flange 12 of the base.

In accordance with the invention a positive and accurate indication of the counterbalance point is provided by a novel signal device adapted to be associated with the test cell. The signal device may be arranged to provide either a visual or an audible signal and as herein shown comprises an electric lamp 52 and a suitable source of current such as a transformer T connected in a series circuit with the base 10 and platen 13 of the test cell. Connections between the signal device and the test cell are made by means of flexible conductors 53 and 54 terminating in plugs 55 and 56 adapted for insertion respectively in sockets 57 and 58 in the base 10 and in the ball joint member 51, the latter being electrically connected with the platen through the companion ball joint member 52.

In operation, current flows in the signal circuit to light the lamp 52 as long as the platen is in contact with the flange 12 of the base. Immediately upon the breaking of such contact the circuit for the lamp is interrupted thus extinguishing the lamp. The operator is therefore positively informed at the instant a state of equilibrium is established in the specimen and the operation of the loading machine may be discontinued and the necessary pressure readings taken therefrom. The pressure required to establish such equilibrium as compared with the pressure initially applied to the specimen represents the compression fatigue of the specimen.

The facility with which various properties of elastomeric materials may be tested with the improved apparatus will be readily apparent from the foregoing description. To summarize briefly, the apparatus is prepared for a test by unscrewing the sleeve member from the base 10 to provide access to the interior thereof. The specimen S may then be placed on the supporting surface 14 of the platen which, of course, is centered in the base by the platform structure upon which it is temporarily supported.

With the specimen in place the sleeve member with the plunger 21 locked thereto is screwed into the base until the end surface 24 of the plunger contacts the specimen. The initial height of the specimen may then be read off on the scales 36 and 37 for record purposes.

As indicated above, tests may be made on the basis of imparting a predetermined deformation to the specimen or of application of a predetermined initial pressure thereto. In the latter case, the test cell is placed in the compression loading machine with the locking pin 30 withdrawn to free the plunger 21 from the sleeve member 20. The loading machine is then operated to apply the desired pressure to the plunger. While such pressure is maintained by the machine, the sleeve member is screwed down until the locking pin can pass through the holes 31 and 32 and thus lock the parts together. The amount of deformation produced by the pressure thus applied is indicated by the scales 36 and 37.

To produce a predetermined deformation of the specimen the test cell is placed in the compression loading machine as above explained but, before pressure is applied to the plunger 21, the sleeve member 20 is screwed down to the position required to produce the desired deformation as indicated on the scales 36 and 37. Thereafter the loading machine is operated to advance the plunger sufficiently to permit insertion of the locking pin 30.

After insertion of the locking pin in the test cell the relative positions of the plunger and platen surfaces are rigidly maintained as shown in Fig. 3 and the cell may be removed from the loading machine without releasing the compressed specimen. In practice the specimens are usually maintained under constant deformation for extended intervals and under predetermined temperature and humidity conditions. For this purpose the test cell and compressed specimen may be placed in an oven or other chamber in which the desired temperature and humidity conditions are maintained in any suitable manner. For use under such conditions all parts of the test cell are preferably constructed of material such as stainless steel which does not deteriorate when subjected to extremes of heat and humidity.

After suitable aging, the test cell and specimen are removed from the aging chamber and the compression set or the change in force exerted by the specimen is measured. To measure the compression set, sufficient pressure is applied to the plunger 21 to permit withdrawal of the locking pin 30 and the plunger is allowed to rise under the action of the specimen as shown in Fig. 5. The sleeve member 20 is then screwed out of the base until the holes 31 and 32 are in register for admission of the locking pin 30. The height of the specimen as represented by the spacing of the supporting surface 14 and the plunger surface 24 is then read off on the scales 36 and 37. This height, compared with the original height of the specimen, represents the compression set.

To determine the change in force exerted by the compressed specimen after a period of aging, the test cell is placed in the loading machine in inverted position as shown in Fig. 4 with the equalizer 50—51 interposed between the platen 13 and the operating member of the machine. The testing device or lamp 52 is then connected to the base 10 and member 51, the lamp lighting in a circuit including the platen and the base in series. Pressure is applied to the platen until its contact with the base is broken as indicated by the opening of the lamp circuit, the pressure required to effect such disengagement representing the force exerted by the specimen against the platen since such pressure is effective to counterbalance the pressure of the specimen. This counterpressure, compared with the pressure initially applied to the specimen measures the compression fatigue of the material.

It will be apparent from the foregoing that the invention provides apparatus of novel and advantageous construction by which elastomeric materials may be tested expeditiously and various physical properties thereof may be measured with a high degree of precision. The improved apparatus is simple and rugged in construction and may be used repeatedly for testing purposes.

I claim as my invention:

1. A test cell comprising, in combination, a base, a platen seated on said base providing a surface for supporting a specimen of elastomeric material, means adjustably supported on said base and engageable with the specimen for compressing the same against said platen, said platen being accessible from the exterior of the base for application of a counter force effective to balance the force exerted thereon by the specimen while under compression and thereby unseat the platen from the base, and means responsive to the unseating of said platen for operating a signal indicating that said forces are in balance.

2. A test cell comprising, in combination, a metal base, a movable metal platen resting on said base and providing a surface for supporting a specimen of elastomeric material to be tested, means adjustably mounted on said base operable to apply and maintain a compressive force on the specimen, said platen being accessible from the exterior of the base for application of a counter force to balance the force exerted by the specimen while under compression and thereby move the platen out of contact with said base, and a signal circuit including said base and said platen in series, said circuit being opened by the breaking of the contact between the base and platen when said forces reach a balance.

3. A test cell comprising, in combination, a base, a platen on said base providing a flat surface for supporting a specimen to be tested, a plunger movable toward said platen by external pressure applying means to compress the specimen supported thereon, a tubular member slidably receiving said plunger, said member and said plunger having diametrically disposed holes adapted to register when the parts are positioned in predetermined relation, said member having a screw threaded connection with said base whereby the member may be advanced to effect the registration of said holes after said plunger has been moved to compress the specimen, and a locking pin insertable through the registering holes to lock the plunger to said member and thereby maintain the specimen under compression after removal of the external pressure from said plunger.

4. A test cell comprising, in combination, a base, a platen on said base providing a flat surface for supporting a specimen to be tested, a plunger movable toward said platen by external pressure applying means to compress the specimen supported thereon, a tubular member slidably receiving said plunger, said member and said plunger having diametrically disposed holes adapted to register when the parts are positioned in predetermined relation, said member having a screw threaded connection with said base whereby the member may be advanced to effect the registration of said holes after said plunger has been moved to compress the specimen, cooperating scales in said base and said member for indicating the amount the specimen has been compressed, and a locking pin insertable through the registering holes to maintain said plunger in specimen compressing position after removal of the external pressure from the plunger.

HOMER H. BASHORE.

REFERENCES CITED

The following references are of record in the file of this patent:

UNITED STATES PATENTS

| Number | Name | Date |
|---|---|---|
| 753,015 | Tretch | Feb. 23, 1904 |
| 1,293,984 | Trompson | Feb. 11, 1919 |
| 1,819,232 | Cropper | Aug. 18, 1931 |
| 2,325,027 | Anway | July 27, 1943 |

FOREIGN PATENTS

| Number | Country | Date |
|---|---|---|
| 257,066 | Great Britain | Aug. 26, 1926 |
| 387,542 | Germany | Dec. 29, 1923 |